US009840983B2

(12) United States Patent
Karlberg

(10) Patent No.: US 9,840,983 B2
(45) Date of Patent: Dec. 12, 2017

(54) WORKING CYLINDER FOR AN ENERGY CONVERTER

(71) Applicant: Nils Karlberg, Le Bez (FR)

(72) Inventor: Nils Karlberg, Le Bez (FR)

( * ) Notice: Subject to any disclaimer, the term of this patent is extended or adjusted under 35 U.S.C. 154(b) by 65 days.

(21) Appl. No.: 14/396,613

(22) PCT Filed: Apr. 24, 2013

(86) PCT No.: PCT/SE2013/050453
§ 371 (c)(1),
(2) Date: Oct. 23, 2014

(87) PCT Pub. No.: WO2013/162457
PCT Pub. Date: Oct. 31, 2013

(65) Prior Publication Data
US 2015/0135702 A1    May 21, 2015

(30) Foreign Application Priority Data
Apr. 25, 2012 (SE) .................................... 1250415-5

(51) Int. Cl.
*F02G 1/043* (2006.01)
*B23P 19/04* (2006.01)
(Continued)

(52) U.S. Cl.
CPC ............ *F02G 1/0435* (2013.01); *B23P 19/04* (2013.01); *F01N 3/2066* (2013.01); *F02G 1/043* (2013.01);
(Continued)

(58) Field of Classification Search
CPC ........ F02G 1/043; F02G 1/0435; F02G 1/044; F02G 1/045; F02G 1/047; F02G 1/05;
(Continued)

(56) References Cited

U.S. PATENT DOCUMENTS 6,195,992 B1    3/2001   Nommensen
6,701,708 B2    3/2004   Gross et al.
(Continued)

FOREIGN PATENT DOCUMENTS

CN      101044297 A      9/2007
DE      EP 0691467 A1 *  1/1996  ............. F02G 1/043
(Continued)

OTHER PUBLICATIONS

Office Action for corresponding application CN201380022152.5 dated Aug. 5, 2015.
(Continued)

*Primary Examiner* — Mark Laurenzi
*Assistant Examiner* — Mickey France
(74) *Attorney, Agent, or Firm* — Fishman Stewart PLLC

(57) ABSTRACT

A working cylinder is provided, comprising at least one disc-like displacer (120) rotatably supported in a cylindrical block (114), which displacer (120) is arranged between two annular flanges (110) extending radially inwards from said block (114) on each sides of said displacer (120) such that said displacer (120) will be arranged in parallel with said flanges (110) upon rotation, wherein at least one of said flanges (110) comprises a plurality of sections including a first section (112*a*) having a first temperature, a second section (112*b*) having a second temperature being lower than said first temperature, and two insulating sections (112*c*, 112*d*) completely preventing contact between said first section (112*a*) and said second section (112*b*), and wherein said displacer (120) comprises a cutout (122) for rotating a volume of working fluid across the sections (112), which cutout is dimensioned such that for every rotational position it does not overlap the first section (112*a*) and the second section (112*b*) at the same time.

18 Claims, 3 Drawing Sheets

(51) Int. Cl.
*F02G 1/055* (2006.01)
*F02G 1/057* (2006.01)
*F01N 3/20* (2006.01)

(52) U.S. Cl.
CPC .............. *F02G 1/055* (2013.01); *F02G 1/057* (2013.01); *F02G 2253/01* (2013.01); *F02G 2270/10* (2013.01); *Y02T 10/24* (2013.01); *Y10T 29/4927* (2015.01)

(58) Field of Classification Search
CPC ...... F02G 1/053; F02G 1/055; F02G 2270/02; F02G 2270/30; F02G 2270/42; F02G 2270/425; F02G 2244/507
USPC .................................................... 60/517–526
See application file for complete search history.

(56) References Cited

U.S. PATENT DOCUMENTS

| | | | |
|---|---|---|---|
| 7,677,039 B1 | 3/2010 | Fleck | |
| 2003/0000210 A1* | 1/2003 | Gross | F02G 1/057 60/517 |
| 2008/0303289 A1* | 12/2008 | Holliday | F02D 29/00 290/4 R |
| 2009/0000294 A1 | 1/2009 | Misselhorn | |
| 2010/0287936 A1* | 11/2010 | Klutchenko | F02G 1/043 60/682 |

FOREIGN PATENT DOCUMENTS

| | | |
|---|---|---|
| DE | 19809847 A1 | 9/1999 |
| EP | 000691467 A1 | 1/1996 |
| JP | 59218345 A * | 12/1984 |
| JP | 2002242761 A | 8/2002 |
| JP | 2003083166 A | 3/2003 |
| KR | 20050087380 A | 8/2005 |
| WO | 2005083255 A1 | 9/2005 |
| WO | 2011106859 A1 | 9/2011 |

OTHER PUBLICATIONS

International Search Report of corresponding application PCT/SE2013/050453 dated Aug. 26, 2013.

* cited by examiner

WORKING CYLINDER FOR AN ENERGY CONVERTER

CROSS-REFERENCE TO RELATED APPLICATIONS

This application is a United States national phase application under 35 U.S.C. §371 of co-pending international patent application number PCT/SE2013/050453, filed on Apr. 24, 2013, which claims the benefit of Swedish Patent Application No. 1250415-5 filed on Apr. 25, 2012.

TECHNICAL FIELD

The present invention relates to a working cylinder. More particularly, the present invention relates to an energy converter based on the Stirling engine principle including such working cylinder for which a temperature difference of a working fluid is utilized for generating work.

BACKGROUND

Thermal energy may be used in various ways for providing mechanical work. One machine for achieving this is the Stirling engine, i.e. a heat engine that uses different temperatures of a working fluid for converting heat energy to mechanical work.

Different types of Stirling engines have been suggested over the years, of which one, commonly denoted as the beta type, has a cylinder enclosing a fixed amount of air. One end of the cylinder is a hot side, while the opposite end is a cold side. A power piston is moveable within the cylinder due to compression and expansion of the air caused by a temperature change. For this a displacer, in synchronous movement with the power piston, is arranged within the cylinder which distributes the majority of the enclosed air either on the hot side or the cold side by a linear movement. Hence, the frequency of the reciprocal movement of the power piston may be controlled by adjusting the temperatures of the hot and cold sides, respectively.

Although the above-described engine may be utilized for a number of applications, it is difficult to control the power piston with a rapid response due to delay in heating the working fluid. In order to solve this problem, it has been suggested to disconnect the displacer from the power piston, such that the frequency of the power piston may be directly controlled by setting the frequency of the displacer movement.

A yet further improved machine is described in US2003000210. Here, a rotating displacer has a peripheral cutout for moving working fluid through a heat zone and a cold zone, each zone extending 180° along the periphery of the enclosing cylinder. Pressure variations inside the peripheral cutout are converted to mechanical work as the displacer rotates, and a regenerator is further provided for decreasing thermal energy losses. The proposed machine has a significant disadvantage. For the power to increase, the peripheral cutout needs to accommodate a relatively large volume of working fluid. Hence, the peripheral cutout must either have an increased height or a large angular extension. On the other hand, if the angular extension is made too large, there will be simultaneous cooling and heating of the working fluid when the peripheral cutout is partly on the hot side, and partly on the cold side as the displacer rotates. Hence, it will not be possible to increase power output without efficiency loss, and vice versa.

SUMMARY

Accordingly, the present invention preferably seeks to mitigate or eliminate the above-identified deficiencies in the art and disadvantages singly or in any combination and solves at least the above-mentioned problem by providing a device according to the appended claims.

An object of the invention is to provide a working cylinder which may be used for an energy converter with improved thermal efficiency.

According to a first aspect, a working cylinder for an energy converter is provided. The working cylinder comprises at least one disc-like displacer rotatably supported in a cylindrical block, which displacer is arranged between two annular flanges extending radially inwards from said block on each sides of said displacer such that said displacer will be arranged in parallel with said flanges upon rotation, wherein at least one of said flanges comprises a plurality of sections including a first section having a first temperature, a second section having a second temperature being lower than said first temperature, and two insulating sections completely preventing contact between said first section and said second section, and wherein said displacer comprises a cutout for rotating a volume of working fluid across the sections, which cutout is dimensioned such that for every rotational position it does not overlap the first section and the second section at the same time.

The cutout may have an extension area in the transversal plane being enclosable along all radius smaller than the radius of the displacer within an extension area in the transversal plane of said insulating sections.

The cylinder may further comprise a rotational shaft concentrically connected to said displacer.

Each one of said flanges may have a concentric recess for accommodating said rotational shaft.

Each section may form an annular sector, and said cutout may have a shape of an annular sector.

The first section may be thermally connected to a first portion of the block, such that heat supplied to the first portion will be conducted to said first section. Correspondingly, the second section may be thermally connected to a second portion of the block, such that cooling of the second portion will provide cooling of said second section.

Further, the first portion of the block may be completely thermally insulated from the second portion of the block.

The cylinder may further comprise a plurality of displacers, each displacer being arranged between two adjacent flanges. Said plurality of displacers may be supported by a common rotational shaft, and the displacers may be aligned with each other with respect to the angular position of their respective cutout.

According to a second aspect, an energy converter is provided. The energy converter comprises a cylinder according to the first aspect, wherein the block comprises a channel in fluid connection with the working fluid being rotated by the displacer for transmitting pressure pulses occurring upon rotation of the displacer.

The energy converter may further comprise a pressure operated device in fluid connection with said channel.

According to a third aspect, a method for providing a working cylinder is provided. The method comprises the steps of providing at least one disc-like displacer rotatably supported in a cylindrical block, which displacer is arranged between two annular flanges extending radially inwards from said block on each sides of the displacer such that said displacer will be arranged in parallel with said flanges upon rotation, providing at least one of said flanges with a plurality of sections, heating a first section to a first temperature, cooling a second section to a second temperature being lower than said first temperature, providing two insulating sections completely preventing contact between said first section and said second section, and providing a cutout in said displacer for rotating a volume of working fluid across the sections, which cutout is dimensioned such that for every rotational position it does not overlap the first section and the second section at the same time.

According to a fourth aspect, a method for manufacturing a working cylinder is provided. The method comprises the steps of providing a pre-manufactured stack of block-flange sections forming a hot side of the working cylinder; providing a pre-manufactured stack of block-flange sections forming a cold side of the working cylinder; providing two pre-manufactured stacks of block-flange sections forming insulating sides of the working cylinder; providing a displacer assembly including at least one disc-like displacer having a cutout for rotating a volume of working fluid across the hot, cold, and insulating sides of the working cylinder; arranging said permanufactured stacks of block-flange sections to enclose said displacer assembly such that said displacer assembly is rotatable within said working cylinder and such that each one of said displacers is arranged between two annular flanges formed by the block-flange sections and extending radially inwards from a block on each sides of said displacer such that said displacer will be arranged in parallel with said flanges upon rotation, whereby the cutout is dimensioned such that for every rotational position it does not overlap the hot side and the cold side at the same time, and arranging an enclosure to surround the entire periphery of the insulating sides for sealing said working cylinder.

BRIEF DESCRIPTION OF DRAWINGS

Hereinafter, the invention will be described with reference to the appended drawings, wherein.

DETAILED DESCRIPTION

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended claims. Furthermore, the terminology used in the detailed description of the particular embodiments illustrated in the accompanying drawings is not intended to be limiting of the invention.

Figure 1:
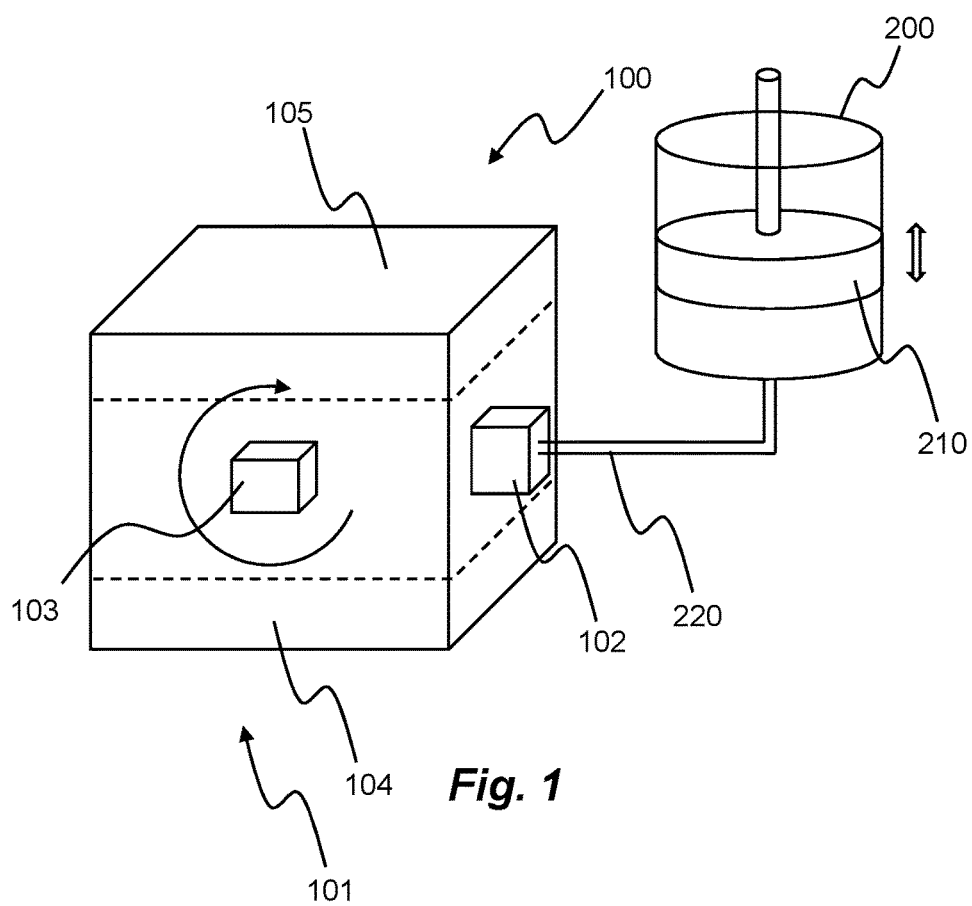
FIG. 1 is a schematic view illustrating an energy converter according to an embodiment.

Starting with FIG. 1, an embodiment of an energy converter 100 is shown. The energy converter is preferably used as a device for converting a temperature gradient to pressure differences of a predetermined frequency, in which pressure differences may be used to generate mechanical work. The energy converter 100 is configured to change the temperature of a working fluid in a periodic manner, whereby the pressure of the working fluid will increase during heating. Correspondingly, a pressure decrease will occur during cooling whereby the pressure difference may be utilized by various mechanical, electrical, or electromechanical systems for converting the pressure difference into mechanical work or a different form of energy. For example the energy converter 100 may be used in a Stirling engine, or any other machine involving a pressure operated component such as a piston, a membrane, a piezo element, etc. As is shown in FIG. 1, the energy converter 100 is connected to an engine cylinder 200, in which a piston 210 is urged to move linearly. The piston 210 may e.g. be connected to a crank shaft (not shown) for converting the linear motion to a rotary motion.

The engine cylinder 200 may be connected to a working cylinder 101 by means of a channel 220, through which channel 220 pressure variations within the working cylinder 101 are transmitted to the engine cylinder 200 for moving the piston 210 in a reciprocal manner. For this, the working cylinder 101 is provided with a connection 102 to which the channel 220 is in fluid connection with.

Generally, the working cylinder operates for rotating a working fluid between a hot section 104 and a cold section 105 by means of a motor 103. When the working fluid has been heated by the hot section, the pressure within the working cylinder will increase whereby such pressure increase will force the piston 210 of the engine cylinder 200 to move. Correspondingly, cooling of the working fluid will provide a pressure decrease causing the piston 210 to move in the opposite way. Hence, by controlling the frequency of the heating cycle of the working fluid, it is possible to operate the energy converter continuously over a wide range of speed.

Figure 2:
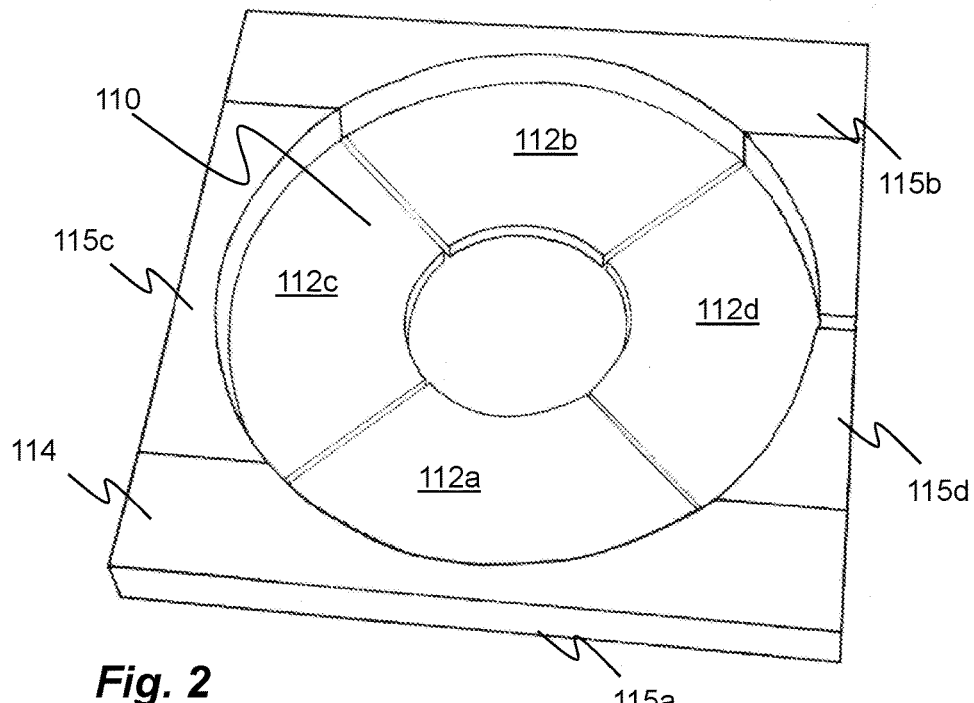
FIG. 2 is a perspective view of a circular flange of a working cylinder according to an embodiment.
Figure 3:
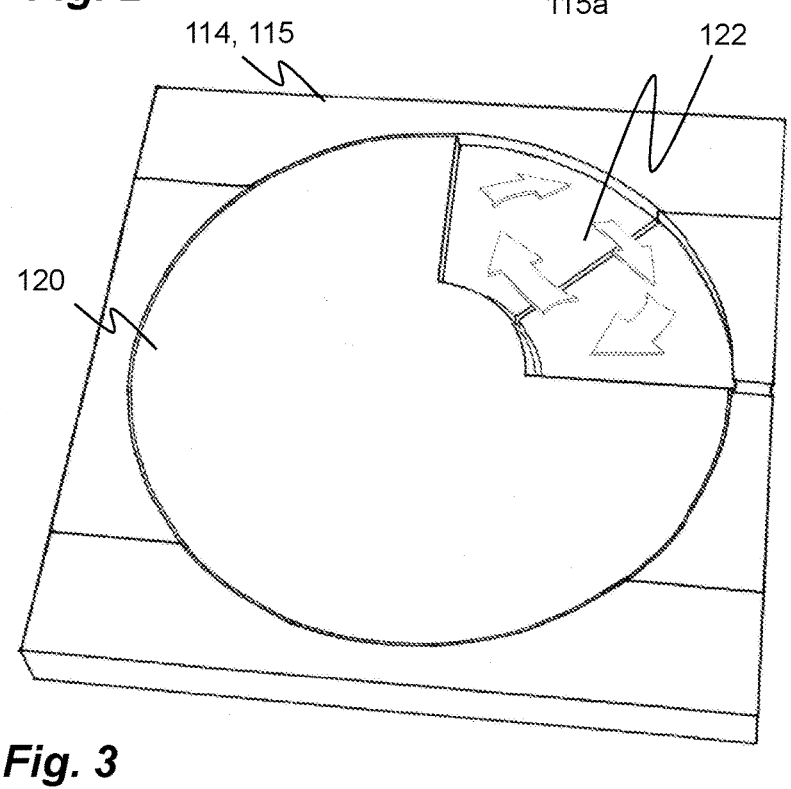
FIG. 3 is a top view of a displacer of a working cylinder according to an embodiment.

For describing the structural details of the energy converter 100 reference is also made to FIGS. 2 and 3. Generally, the energy converter 100 includes the working cylinder 101 which includes a plurality of stacked flanges 110, and a plurality of displacers 120, wherein each displacer 120 is arranged between two adjacent flanges 110. Starting with FIG. 2, a top view of a circular flange 110 of the cylinder 101 is shown. The circular flange 110 extends radially inwards the cylinder 101 from a cylinder block 114, and the flange 110 has a plurality of sections 112. The outer periphery of the circular flange 110 is connected to, or formed integrally with, a cylindrical block 114. For this, the block 114 forms a hollow space in the shape of a cylinder, although the outer shape of the cylinder block may have other shapes, e.g. a cubic shape as indicated in FIG. 1. In the shown embodiment, each flange 110 has four sections 112a-d, each section extending 90° of the circle. Further, the block 114 has a thickness which is slightly larger than the thickness of the circular flange 110 in order to enclose the displacer 120 adjacent to the circular flange 110 without extending over the block 114.

A first section 112a of the flange 110 is formed as a hot section, whereby a heat source (not shown) is connected to the first section 112a for transferring heat to the first flange 112a. Hence, the hot section 112a forms a part of the hot side 104 shown in FIG. 1. A second section 112b is arranged opposite the first section 112a and is thus spaced from the first section 112a by 90°. The second section 112b forms a cold section, whereby a cooling device (not shown) is connected to the second section 112b for keeping the temperature of the cold section 112b at a desired temperature, which temperature is lower than the temperature of the hot section 112a. Hence, the cold section 112b forms a part of the cold side 105 shown in FIG. 1. Intermediate sections 112c, 112d are arranged adjacent to the first section 112a and the second section 112b such that each one of the first and second sections 112a, 112b forms a border to two intermediate sections 112c, 112d. The intermediate sections 112c, 112d are provided as heat insulating sections such that heat transfer between the hot section 112a and the cold section 112b is minimized. Hence, the temperature difference between the hot section 112a and the cold section 112b may be maintained in an efficient manner.

The cylinder block 114 is preferably also divided into block sections 115, each of which is thermally connected to an associated flange section 112. As can be seen in FIG. 2, the block sections 115 do not share the same dimensions. Preferably, the block sections 115a, 115b associated with the hot and cold sections 112a, 112b of the flange 110 are somewhat bigger than the intermediate block sections 115c, 115d, such that the heat source and/or the cooling device may act on a larger volume or mass for increasing the heat transfer to and from the flange sections 112a, 112b. The hot block section 115a acts as a buffer for heat, whereby the hot sections 112a of the flanges 110 will receive enough heat energy when the working fluid has withdrawn a specific amount of heat energy. Consequently, the cold block section 115b acts as a heat cache, whereby the cold sections 112b of the flanges 110 may absorb heat to the heat cache upon cooling.

By arranging two identical flanges 110 on top of each other, spaced apart in the normal direction, a small space is formed between the two flanges 110. Within this space, being preferably symmetrical such that the axial distance between the two flanges 110 is constant over the complete surface, the displacer 120 is arranged. The displacer 120, shown in FIG. 3, has a disc shape having a radius being equal to or slightly less than the radius of the circular flange 110. A cutout 122 is provided, which cutout 122 may have a shape of an annular sector. Preferably, the angular extension of the cutout 122 corresponds to the angular extension of the intermediate sections 112c, 112d.

Once inserted between two flanges 110, the displacer 120 is arranged such that it may rotate thus causing the cutout 122 to move between the different sections 112a-d of the flanges 110. Working fluid, such as air or any other gaseous media, enclosed within the cutout will thus be forced to move between the sections 112a-d of the flanges thus causing the temperature of the air, or other working fluid such as low viscous media, to change periodically.

Preferably, the displacer 120 is sealed against the abutting surfaces of the flanges 110 such that the working fluid may only to a very small amount escape from the cutout 122. In such manner, the majority of the working fluid will always be entrapped within the cutout 122 as the displacer 120 rotates within the cylinder, while a small amount of working fluid is distributed in the working cylinder for equalizing the pressure within the working cylinder 101, e.g. in the small slit preferably being present between the displacer 120 and the adjacent flanges 110. Hence, the working fluid will be heated once the cutout 122 is arranged at the hot section 112a, while heating continues as the cutout 122 continues its rotational movement across the hot section 112a. Subsequently, the cutout 122 will have moved across the hot section 112a entirely such that it now is arranged across the intermediate section 112c where no heat transfer occurs. At this position, the working fluid will have a maximum temperature and hence a maximum pressure. As the displacer 120 continues to rotate from a position where it is completely enclosed by two stacked intermediate sections 112c, or 112d, the cutout 122 will move into the cold section 112b whereby the temperature of the working fluid will start to decrease. Lowering of the temperature of the working fluid will proceed as long as at least some part of the cutout 122 is positioned across the cold section 112b, i.e. for approximately 180°.

Figure 4:
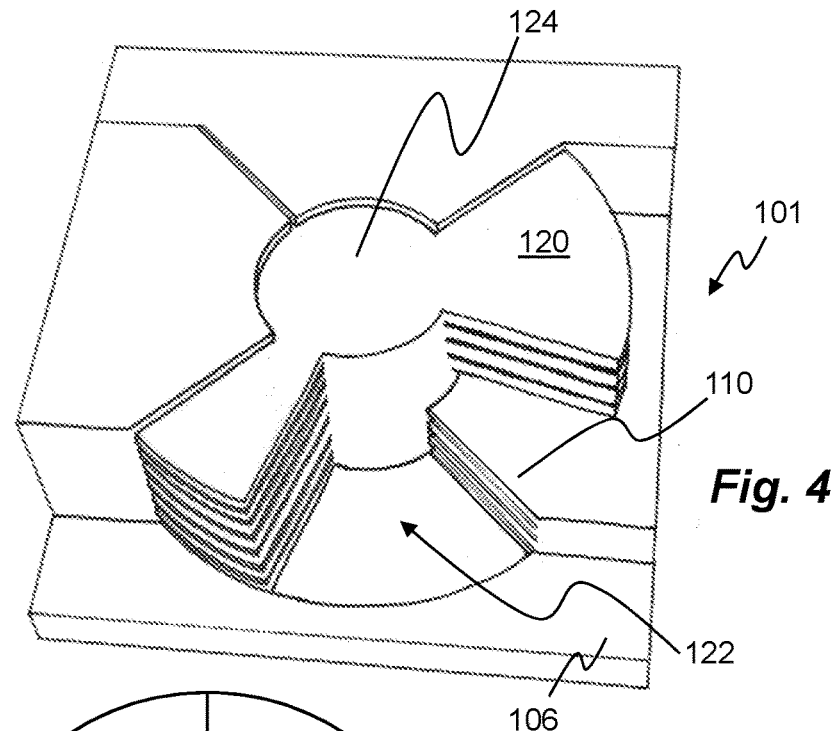
FIG. 4 is a perspective view of a working cylinder according to an embodiment.

Now turning to FIG. 4, a flange-displacer assembly is shown. The flange-displacer assembly forms a working cylinder 101, which may be supplemented by a top cover (not shown) and a bottom cover 106, as well driving means and control means (not shown) for rotating the displacer relative the flanges 110. The control means may be arranged externally of said working cylinder. As can be seen, the working cylinder 101 includes a plurality of stacked flanges 110, and a corresponding plurality of displacers 120. If the actual number of flanges 110 is n, the corresponding number of displacers 120 may be n−1 for arranging each displacer 120 between two adjacent flanges 110. The displacers 120 are preferably arranged with a common phase, such that the cutouts 122 of the displacers 120 are aligned with each other and consequently positioned at the same angular position during rotation. Hence, all displacers 120 are preferably driven by a common rotational shaft 124 to which they are all connected.

Before mounting the working cylinder 101, the flanges 110 are preferably provided as semi-parts, each semi-part corresponding to a cylinder block section 115 connected to an associated flange section 112. A plurality of semi-parts are connected in a stacked manner, such that the hot side 104 of the working cylinder 101 is provided as a pre-manufactured piece, including a stack of block-flange sections. Correspondingly, the cold side 105 of the working cylinder 101 as well as the insulating sides of the working cylinder 101 are provided as pre-manufactured pieces, each piece including a stack of block-flange sections. In addition to the pre-manufactured stack of cylinder block-flange sections, a displacer assembly is provided comprising a plurality of displacer discs 120 arranged in a stacked manner and connected to each other by means of a concentric rotational shaft 124. Each displacer disc 120 is arranged from its adjacent displacer discs 120 at a predetermined distance, which distance substantially corresponds to the distance between two adjacent flanges 110 of the stack of block-flange sections.

By separating the hot and cold pre-manufactured stack of block-flange sections from each other by means of the insulating pre-manufactured stack of block-flange sections heat transfer in the block 114 is significantly reduced. Each pre-manufactured stack of block-flange sections may be provided by molding or as machine processed components, and they may not necessarily be provided by connecting several pre-manufactured stacks of block-flange sections.

Upon mounting the working cylinder 101, the pre-manufactured stacks of block-flange sections are inserted within the free space of the displacer assembly (i.e. the distance between two adjacent displacer discs 120), and then connected to each other in order to form a closed cylinder 101 in which the displacers 120 are able to rotate. The desired volume of working fluid may be injected into the working cylinder 101 prior to sealing the cylinder 101, e.g. prior to providing a top and bottom cover. Moreover, a laminate enclosure (not shown) in the form of an open ended box may be provided and slid onto the working cylinder 101 for sealing the working cylinder 101. Sealing may be performed by welding or any other suitable way for providing a sufficient contact between the laminate and the block 114. The laminate enclosure preferably prevents heat transfer from the block 114 to the surrounding environment by having no thermally conductive bridges in the longitudinal as well as the transversal direction. Hence, the laminate enclosure also forms a top cover for the working cylinder 101.

The laminate enclosure may have a magnetic structure and interior means for allowing an electrical motor to be placed. Hence, control means for the motor may be provided on the outside (as shown in FIG. 1) for completely eliminating the need for cables etc. to be guided through the working cylinder.

One of the pre-manufactured stacks of block-flange sections has a bore into which the pressure of the working fluid may be distributed as the cutout 122 is moving inside the working cylinder 101. The bore may further be connected to a conduit, e.g. the channel 220 shown in FIG. 1, for allowing the pressure of the working fluid to drive the energy converter 100.

A motor (indicated as 103 in FIG. 1) may be connected to the rotational shaft 124 of the displacers 120 for rotating the displacers 120 within the working cylinder 101. Further, a controller (not shown) is preferably connected to the motor 103 for controlling the speed of rotation and thus the frequency of which the working fluid is moved across the different flange sections 112.

Some general comments on the described embodiments will now be given. Based on PV=nrT the expansion/retraction of a working fluid (air, gas, vapor, etc.) in a closed system is used to get work done. When the working fluid is heated the increased pressure is allowed to operate on a connected device, e.g. by pushing a membrane or a piston, and when the working fluid retracts, it provides a pulling action on the pressure operated device.

Within the working cylinder 101 the working fluid is exposed to hot and cold surfaces in a controlled cycle in a swirl with forced convection. The energy converter 100 preferably keeps the ratio between the surface for heat transfer and the volume of the working fluid at a desired level during scaling.

In fact, the rotating movement of the cutout 122 will force the working fluid to swirl in a controlled manner (as indicated by the arrows in FIG. 3). Hence, heat transfer between the working fluid and the hot or cold flange sections 112a, 112b will increase and thus also the efficiency of the working cylinder. On the other hand, a small volume of fluid present in the space formed between the displacer 120 and the flange sections 112 will move in a laminar flow, thus reducing heat transfer at these areas.

A large surface of the flange sections 112 is needed to transfer heat to and from the working fluid. If it wasn't for the segmented design, the volume of the medium would grow with the cube and the heat transfer surface would only grow with the square.

During the operating cycle, i.e. during one revolution of the displacer(s) 120, the working fluid will pass four totally separated phases: i) neutral, for maintaining the swirl, ii) hot, i.e. during energy transfer to the working fluid, iii) neutral, for maintaining the swirl, and iv) cold, i.e. during energy transfer from the working fluid. The working fluid will never be in more than two of those sectors at the same time. As the working fluid passes through the phases, the full cycle may be defined in two parts: 1) "Warming cycle" and 2) "Cooling cycle". "Warming cycle": a) Neutral-Warm, b) Warm, c) Warm-Neutral makes almost half a turn. The working fluid in the hot and insulating sections 112a, 112c gets warm and the pressure in the whole segmented working cylinder goes up. "Cooling cycle": Neutral-Cold, Cold, Cold-Neutral makes the other half turn. The working fluid cools down and the pressure falls in the segmented working cylinder.

In between the warming cycle and the cooling cycle, as in between the cooling cycle and the warming cycle, there may be very short moments being 100% neutral, preferably about two degrees of a 360 circle each.

The pressure variation can be obtained from anywhere in the working cylinder, to be used by, for example, a piston, a membrane, a pressure meter, a piezo element or any other pressure operated device.

The working fluid is moved between the hot and cold surfaces with the segmented rotating displacer shaft operated by a motor. By controlling the shaft of the motor it is possible to control the length of time the working fluid is exposed to the warming and the cooling cycle. It may also be possible to totally control the rpm and the power output within the full span from zero rpm up to a limit beyond the maximum performance rpm. The maximum performance rpm is preferably defined as the maximum speed still maintaining an effective heat transfer.

By installing the motor and its associated shaft inside the working cylinder, or outside the segmented working cylinder e.g. by magnetic transmission, the working cylinder gets totally sealed. Hence, the risk for leaks stealing power is thus minimized. When an external motor is rotating the displacer assembly by means of magnetic coupling it will result in a pressure increase in the working fluid as the cut-out is positioned over the hot flange section 112a, and a pressure decrease as it rotates from the hot to the cold flange section 112b. The heat conducting flange sections 112a, 112b may have a thermal sensor, e.g. close to the tip of a flange, for feeding back information to a control system. Hence, it is possible to measure the temperatures of the flanges 110 in real time thus making it possible to predict and determine the actual performance of the working cylinder. Further, it may be possible to provide pressure sensors inside the working cylinder for continuously measuring the pressure variations.

Depending on application, one may use a saturated vapor that has a phase transition within the temperature difference as the working fluid used to run the converter. This may provide better performance than e.g. air. As an example one may use acetic acid ethyl ester in "green" low temperature difference applications.

Further, connecting two working cylinders with 180° angle between the respective cutouts is favorable for the use of double-acting pistons. Connecting three working cylinders with 120° angle between the respective cutouts 122 may provide a more smooth operation using pistons powering a shaft.

No matter what configuration being chosen, an advantageous feature is that it is possible to change and sync the relative cutout positions on the fly since every cylinder has its own motor to control the movements of the displacer assembly.

Preferably, the displacer assembly is balanced with counterweigths and has a natural frequency corresponding to a critical shaft speed that is outside the working range, or in the very slow startup range. In a preferred embodiment, at least one of the counterweights is magnetic and may thus be used for transmitting a rotational movement from an external electromagnetic source to the displacer.

The working fluid provides the following: 1) forced convection from rotation of the displacer assembly, with a swirl for allowing pressure differences to engage the pressure operated device/devices, 2) to form a laminar flow between the displacers and the circular flanges, 3) to isolate the thin gap between the neutral and conducting flanges where it also performs pressure equalization within the working cylinder.

Figure 5A:
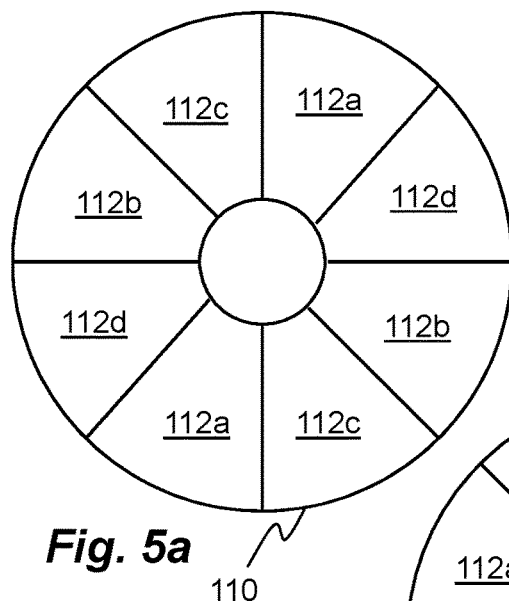
FIG. 5a is a top view of the sections of a flange according to an embodiment.

Now turning to FIGS. 5a-b, different embodiments of the sections 112 of a flange 110 will be discussed. Starting with FIG. 5a, the flange is divided into eight different sections. Each one of the sections 112 has a fixed angular extension of 45°, and forms a sector. A first hot sector 112a is followed by an insulating sector 112d, followed by a cold sector 112b. After the cold sector 112b an insulating sector 112c is arranged before a half turn is finished. The following half turn is symmetrical with the first half turn as is shown in FIG. 5a.

Figure 5B:
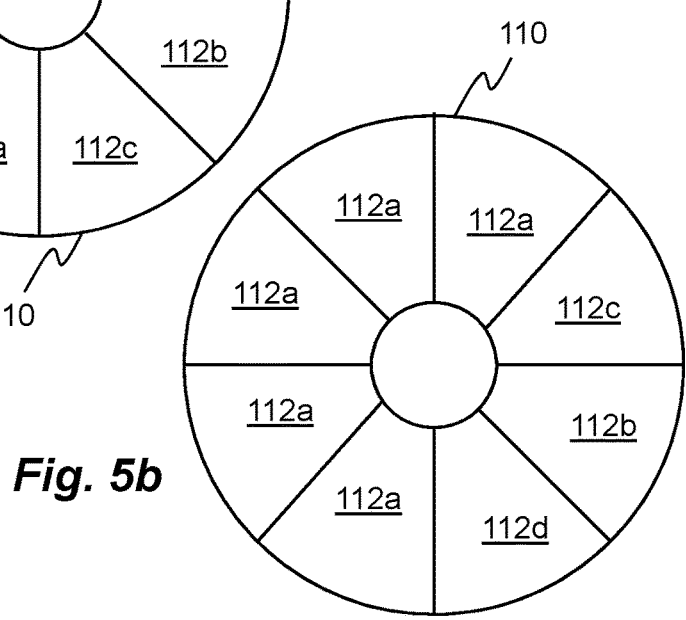
FIG. 5b is a top view of the sections of a flange according to an embodiment.

FIG. 5b shows another embodiment of the sections 112 of a flange. Here, a cold sector 112b is adjacent to two insulating sectors 112c, 112d, arranged on each side of the cold sector 112b. Between the two insulating sectors five hot sectors 112a are arranged. Hence, it is possible to design the working cylinder 101 depending on the available heat source and cooling device, such that an efficient heat transfer to and from the working fluid is obtained.

In view of the above described embodiments, it is possible to distribute the hot and cold sections 112a, 112b in a vast amount of different ways as long as they are separated by insulating sections which have at least the size of the cutout 122 of the displacer 120. Although only circular sectors have been described, it will of course be possible to provide different shapes of the sectors as well as of the cutout as long as the cutout never is allowed to extend across the hot sections and the cold section at the same time.

The displacers 120 are preferably constructed to provide turbulence and a controlled convective swirl while they rotate for moving the working fluid. Hence, the heat transfer due to forced convection and radiation between the flanges 110 and the working fluid will increase. For example, tapering of the edges of the cutout 122 will add a swirl component in a direction perpendicular to the transversal plane.

In a yet further embodiment, the flanges 110 may be provided with perforations for improving pressure equalization within the working cylinder 101. This may also provide the additional effect of increasing the surface for improving heat transfer, The perforations may be made very small, e.g. having a radius in the range of mm, and may be distributed across the entire surface of the flanges 110.

It will be appreciated that the embodiments described in the foregoing may be combined without departing from the scope as defined by the appended patent claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A working cylinder, comprising:
a cylindrical block having two annular flanges extending inwardly from each side of said block; at least one disc-like displacer rotatably supported in said cylindrical block, said at least one disc-like displacer being positioned between said two annular flanges such that said at least one disc-like displacer will be arranged in parallel with said flanges upon rotation of said at least one disc-like displacer, wherein
at least one of said flanges comprises a plurality of generally co-planar sections including a first section having a first temperature, a second section having a second temperature lower than said first temperature, and two insulating sections completely preventing contact between said first section and said second section, and wherein
said at least one disc-like displacer comprises a cutout for rotating a volume of a working fluid across the generally co-planar sections, which cutout is dimensioned such that for every rotational position said cutout does not overlap the first section and the second section at the same time,
said working cylinder further comprising a motor in driving connection with said at least one disc-like displacer to rotate said at least one disc-like displacer relative to the flanges such that the frequency of a heating cycle of the working fluid is controlled;
wherein block sections of the cylindrical block associated with the first section and the second section of the at least one of said flanges are larger than block sections of the cylindrical block associated with the insulating sections of the at least one of said flanges.

2. The cylinder according to claim 1, wherein said cutout has an extension area in a transversal plane enclosable along all radii smaller than the radius of the displacer within an extension area in the transversal plane of said insulating sections.

3. The cylinder according to claim 1, further comprising a rotational shaft concentrically connected to said displacer.

4. The cylinder according to claim 3, wherein each one of said flanges has a concentric recess for accommodating said rotational shaft.

5. The cylinder according to claim 1, wherein each section forms an annular sector, and wherein said cutout has a shape of an annular sector.

6. The cylinder according to claim 1, wherein the first section is thermally connected to a first portion of the block, such that heat supplied to the first portion will be conducted to said first section.

7. The cylinder according to claim 1, wherein the second section is thermally connected to a second portion of the block, such that cooling of the second portion will provide cooling of said second section.

8. The cylinder according to claim 6, wherein the first portion of the block is completely thermally insulated from the second portion of the block.

9. The cylinder according to claim 1, comprising a plurality of displacers, each displacer being arranged between two adjacent flanges.

10. The cylinder according to claim 9, wherein said plurality of displacers is supported by a common rotational shaft.

11. The cylinder according to claim 10, wherein said displacers are aligned with each other with respect to the angular position of their respective cutout.

12. An energy converter, comprising a cylinder according to claim 1, wherein the block comprises a channel in fluid connection with the working fluid being rotated by the displacer for transmitting pressure pulses occurring upon rotation of the displacer.

13. The energy converter according to claim 12, further comprising a pressure operated device in fluid connection with said channel.

14. A method for providing a working cylinder comprising the steps of:
provide at least one disc-like displacer rotatably supported in a cylindrical block, said at least one disc-like displacer being arranged between two annular flanges extending radially inwardly from said block on each side of the displacer such that said displacer will be arranged in parallel with said flanges upon rotation,
providing at least one of said flanges with a plurality of generally co-planar sections, including a first section and a second section which are insulated from each other by a third section and a fourth section, said third and fourth sections completely preventing contact between said first and second sections;
heating a first of said plurality of sections to a first temperature, cooling a second of said plurality of sections to a second temperature, said second temperature being lower than said first temperature,
providing a cutout in said displacer for rotating a volume of a working fluid across the generally co-planar sections, said cutout being dimensioned such that for every rotational position said cutout does not overlap the first section and the second section at the same time, and
providing a motor which rotationally drives said at least one disc-like displacer to rotate said at least one disc-like displacer relative to the annular flanges;
wherein block sections of the cylindrical block associated with the first section and the second section of the at least one of said flanges are larger than block sections of the cylindrical block associated with the third and fourth sections of the at least one of said flanges.

15. A method for manufacturing a working cylinder, comprising the steps of:
providing a pre-manufactured stack of block-flange sections forming a hot side of the working cylinder;
providing a pre-manufactured stack of block-flange sections forming a cold side of the working cylinder;
providing two pre-manufactured stacks of block-flange sections forming insulating sides of the working cylinder;
providing a displacer assembly including at least one disc-like displacer having a cutout for rotating a volume of working fluid across the hot, cold, and insulating sides of the working cylinder;
arranging said pre-manufactured stacks of block-flange sections such that said hot side, said cold side, and said insulating sides of said working cylinder are generally co-planer and to enclose said displacer assembly such that said displacer assembly is rotatable within said working cylinder and such that each one of said displacers is arranged between two annular flanges formed by the block-flange sections and extending radially inwardly from a block on each side of said displacer such that said displacer will be arranged in parallel with said flanges upon rotation of said
displacer, whereby the cutout is dimensioned such that for every rotational position said cutout does not overlap the hot side and the cold side at the same time;
providing a motor in driving connection with said displacer, said motor being operable to rotate said displacer relative to the flanges; and
arranging an enclosure to surround the entire periphery of the insulating sides for sealing said working cylinder;
wherein one revolution of the at least one of said annular flanges includes a heating cycle, a cooling cycle, and neutral cycles between the heating cycle and the cooling cycles, each neutral cycle spanning approximately two degrees of the one revolution.

16. The cylinder according to claim 1, wherein the motor is located within an interior of the working cylinder.

17. The cylinder according to claim 1, wherein one revolution of the at least one of said flanges includes the heating cycle, a cooling cycle, and neutral cycles between the heating cycle and the cooling cycles, each neutral cycle spanning approximately two degrees of the one revolution.

18. The cylinder according to claim 1, wherein the first flange section and the second flange section each includes a thermal sensor configured to measure temperatures of the respective flange sections.

* * * * *